UNITED STATES PATENT OFFICE.

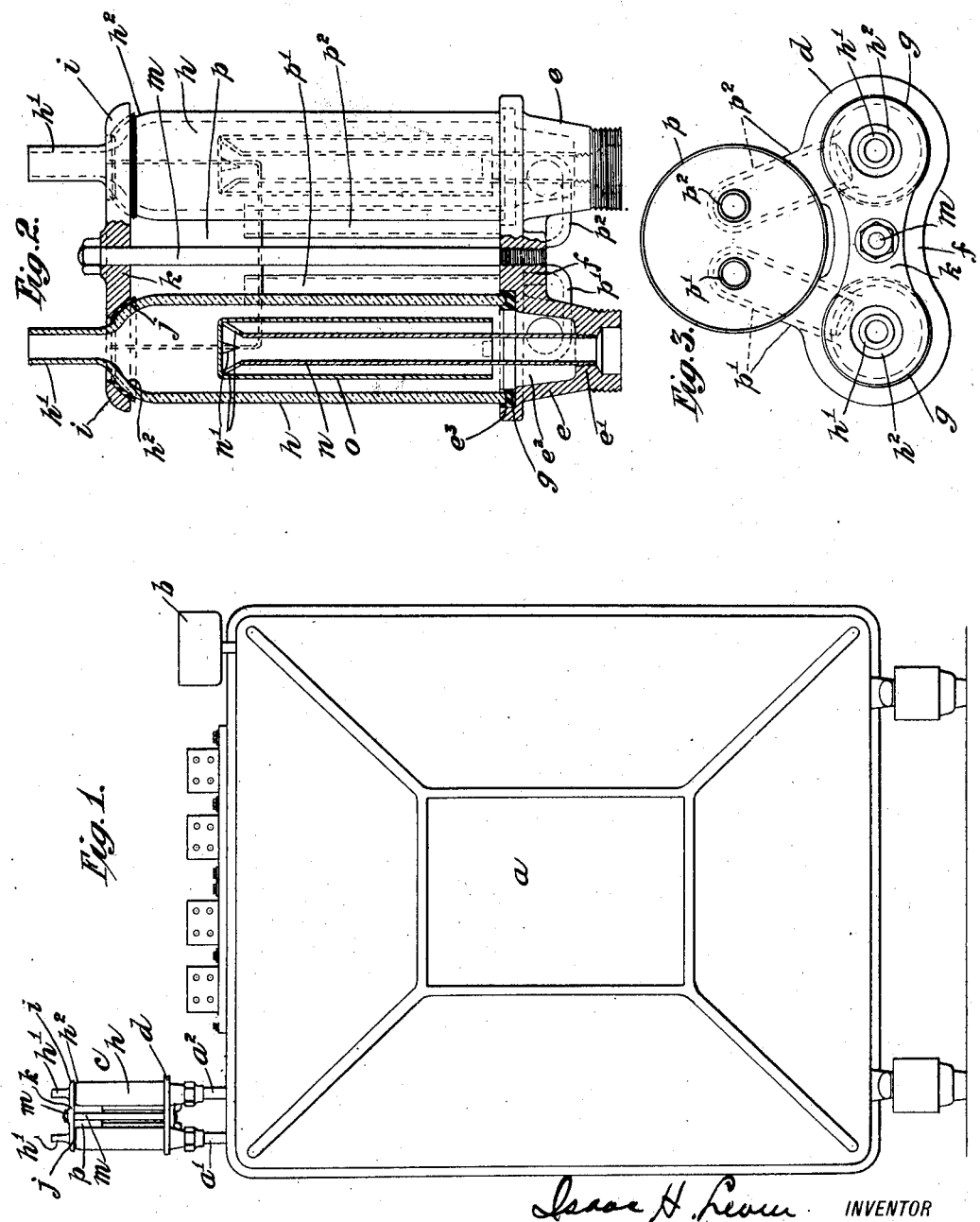

ISAAC H. LEVIN, OF NEW YORK, N. Y.

INDICATOR FOR ELECTROLYTIC CELLS.

1,361,473.  Specification of Letters Patent.  Patented Dec. 7, 1920.

Application filed March 14, 1919, Serial No. 282,764. Renewed November 4, 1920. Serial No. 421,804.

*To all whom it may concern:*

Be it known that I, ISAAC H. LEVIN, a citizen of the United States, residing at the borough of Manhattan, in the city, county, and State of New York, have invented certain new and useful Improvements in Indicators for Electrolytic Cells, of which the following is a specification, reference being had therein to the accompanying drawings, which form a part thereof.

My invention relates to indicators for electrolytic cells, and more particularly to a type of indicator for use upon cells for the generation of oxygen and hydrogen, which indicators form a part of the gas offtake system of such cells.

Heretofore it has been the common practice to use such indicators, or as they are commonly called "lanterns," consisting of a metallic fitting mounted upon the casing of the cell, a metallic head fitting, and a glass tube mounted between said fittings, suitable gaskets being provided at the ends of said tube, the said fittings being secured in relation to said tube and each other by means of tie bolts which must be suitably insulated from the fittings to prevent the formation of a ground connection for the casing through the gas offtake system. This construction is objectionable since expansion of the glass tube is interfered with, and because of the number of points which must be insulated and the difficulty of securing a proper insulation when packing at various points, and securing liquid and gas tight joints at opposite ends of the tube.

There has been devised another type of indicator consisting of a bottle-shaped casing, open at the bottom and having a reduced outlet or throat, which casing is held in place by means of an outwardly projecting flange at the bottom thereof and a yoke bearing upon said flange and forcing it into engagement with a rubber gasket. This type of indicator has proven objectionable because the casing adjacent the out-turned flange is, by reason of the bend of the glass and the reduction of the thickness at the bend, weakened at this point so that the pressure from the securing yoke, which is applied at the weakest point of the casing, has a tendency to break the casing at this point. Furthermore the variance in thickness of the material of the casing results in a variable degree of expansion of different portions thereof under heat. To obviate these conditions it has been found necessary to use fairly thick glass which readily cracks when subjected to changes of temperature.

With these conditions in mind, I have produced an indicator which may be made of fairly thin glass and assembled in the cell structure in a manner to be firmly supported at the bottom and adjacent the top thereof, while permitting the free expansion and contraction of the tubular portion thereof. In an indicator made in accordance with my invention, the glass casing is so mounted that the casing itself forms an insulating joint in the gas offtake system and between the supports for the casing and the cell proper, thus avoiding the necessity for any insulated bushings about the metallic parts holding the casing in place. With this type of indicator only one packing seat is required, this seat being made of resilient material so as to permit the free expansion and contraction of the material of the casing. It is necessary to pack this seat only against liquid, which is much simpler and less difficult than packing against gas.

The only stresses in mounting the casing is a crushing strain applied longitudinally of a tubular portion of the casing and against a spherical portion thereof, which is well adapted to resist such strains. By applying such stresses through a resilient cushion, without the necessity for forming a gas-tight joint, sufficient elasticity or springiness in the structure is afforded to permit sufficient elongation of the casing when heated by the gases passing therethrough, to prevent breakage of the glass with a resultant escape of the gases. The casing throughout may thus be made of uniform thickness, insuring equal expansion and contraction under varying temperatures, and avoiding breakage from unequal expansion and contraction due to varying thicknesses in different parts of the casing. The use of thin glass is made possible by the manner of mounting the casing in relation to the cell, which has very decided advantages since thin glass will stand changes of temperature more readily than thick glass, without breaking.

The invention consists primarily in an indicator for electrolytic cells, embodying therein a fitting carried by, and communicating with the interior of, a cell, said fitting having a circular seat at the top thereof, a resilient gasket in said seat, a casing comprising a cylindrical body of substantially the same diameter throughout, a reduced throat or outlet, and a concaved or spherical portion connecting said body with said outlet, the lower edge of said body being seated upon said gasket and forming a liquid-proof joint therewith, a yoke bearing upon the concaved or spherical portion of said casing, and means whereby said yoke is forced toward said fitting; and in such other novel features of construction and combination of parts as are hereinafter set forth and described, and more particularly pointed out in the claims hereto appended.

Referring to the drawings,

Figure 1 is an end view of an electrolytic cell having indicators made in accordance with my invention applied thereto;

Fig. 2 is a view partly in elevation and partly in vertical section of the indicators shown in Fig. 1, upon a larger scale; and Fig. 3 is a plan view of said indicators.

Like letters refer to like parts throughout the several views.

In the embodiment of my invention shown in the drawings, $a$ indicates an electrolytic cell provided with a water feed cup $b$ and a gas offtake and indicator structure shown at $c$, my invention relating more particularly to said gas offtake and indicator structure.

In cells of this description, it is the ordinary practice to use two similar indicators, one communicating with the compartment in which oxygen is accumulated, and the other communicating with the compartment in which hydrogen is accumulated, these indicators embodying therein casings containing distilled water maintained at a substantially constant level, the gases flowing from the cell being delivered adjacent the bottom of the water in the respective casings and bubbling therethrough in a manner to wash the gases and at the same time indicate to an attendant whether or not the cell is functioning properly.

In the embodiment of my invention shown in the drawings, the indicator structure comprises a fitting $d$ having two branches $e$ communicating respectively with different gas compartments within the cell $a$ through pipes $a'$ and $a^2$ with which they are connected by a suitable union. Said branches are connected by a bridge $f$ spacing said branches the desired distance apart.

The branches $e$ each have a reduced passage $e'$ therein and a well $e^2$ above said reduced passage. About the top of each well $e^2$ is a circular recessed seat $e^3$ having mounted therein a suitable cushion gasket $g$ made of rubber, or other material adapted to resist any chemical action of the fluid in the indicator casing thereon. This gasket is preferably made of pure rubber and provided with an annular slot in the top thereof, as shown.

Mounted upon the gasket $g$ is a casing of glass, or other transparent or semi-transparent material, said casing consisting of a tubular body $h$ of uniform diameter throughout the length thereof, a reduced outlet or throat $h'$, and a concaved or spherical portion $h^2$ connecting the body $h$ and throat $h'$. The lower edge of the body $h$ is adapted to fit within the slot of the gasket $g$ with a sufficiently tight fit to insure the lower edge of said body being packed on the bottom and both sides thereof adjacent the bottom.

Mounted upon said casing is a yoke fitting having two extensions $i$ and $i'$, having openings therethrough adapted to pass over the throat $h'$ of each casing and operatively engage the concaved or spherical portion $h^2$ thereof, a resilient cushion $j$ being interposed between the wall of said opening and said portion $h^2$ to avoid a metal to glass joint, while at the same time affording a cushion opposed in its action to that of the cushion afforded by the gasket $g$. In this manner the casing is held between two cushions, thus minimizing likelihood of breakage and permitting slight elongation of the body $h$ of the casing and slight increase of diameter of the portion $h^2$ thereof.

The extensions $i$ and $i'$ are connected by a bridge $k$ having an opening therein through which the tie bolt $m$ passes, the screw threads of said bolt engaging a screw-threaded opening in the bridge $f$ so that the yoke fitting may be forced toward the fitting $d$ in a manner to secure the desired seating of the casing. By using a yoke having the characteristics described, and by affording a slight lost motion between the bolt and the opening in the bridge $k$, this yoke may readily adapt itself to the two casings in a manner to compensate for any slight variation in the dimensions of different casings.

It will be observed that while the fitting $d$ is of electro-conductive material and has a metallic connection with the cell $a$, and while the yoke fitting has a metallic connection with said fitting, the casings $h$—$h'$—$h^2$ being of non-conductive material, present an elongated section of insulating material which will prevent leakage of current through the offtake system, particularly in view of the fact that the connection of the gas mains is made through the throat $h'$.

It will also be observed that all strains applied to said casing through said yoke and by means of said screw bolt, are applied upon the concaved or spherical portions $h^2$, which are well calculated to resist crushing strains, and that the tubular body $h$ of the casings are subjected only to longitudinal stresses distributed equally throughout every portion thereof.

It will also be observed that the point of engagement of the body $h$ of each casing with the packing gasket $g$ is along an edge of the same thickness as the rest of the body portion, so that there is no weakened portion of the casing at this point. A perfectly tight joint can be secured with a minimum of pressure, by providing a groove in the gasket $g$ as described, the packing not only being about the lower face of the body portion, but upon both the inner and outer walls thereof adjacent said lower face, notwithstanding slight irregularities which may occur upon this lower face.

Secured within the reduced passage $e'$ of each branch $e$ is a gas offtake duct $n$, the upper portion of which is surrounded by a dome $o$ extending downwardly into close proximity to the well $e^2$. The dome $o$ is secured to the top of the duct $n$, suitable gas outlet openings $n'$ being provided adjacent the top of said duct.

Adjacent the fitting $d$ is a cup $p$, leading from which and discharging into the well $e^2$ of the branches $e$ respectively, are pipes $p'$—$p^2$, by means of which the liquid level in the body portions $h$ is maintained at a substantially constant level, or permitted to fluctuate according to varying pressure conditions in the cell.

I have found in actual practice, that an indicator made in accordance with my invention is not only economical as to first cost of parts and as to the cost of assembling, but that no opportunity for gas leaks is afforded, and that highly satisfactory insulating qualities are presented in the indicator. Breakage of the indicator under normal conditions of use, does not occur, notwithstanding that the temperatures in and about the apparatus may range from 120° to 175° F.

It is not my intention to limit the invention to the precise details of construction shown in the drawings, it being apparent that such may be varied to adapt the indicator to different types of cells, without departing from the spirit and scope of the invention.

Having described the invention, what I claim as new and desire to have protected by Letters Patent, is:—

1. An indicator for electrolytic cells embodying therein a fitting carried by, and communicating with the interior of, a cell, said fitting having a circular seat at the top thereof, a resilient gasket in said seat, a casing comprising a cylindrical body of substantially the same diameter throughout, a reduced throat or outlet, and a concaved or spherical portion connecting said body with said outlet, the lower edge of said body being seated upon said gasket and forming a liquid-proof joint therewith, a yoke bearing upon the concaved or spherical portion of said casing, and means whereby said yoke is forced toward said fitting.

2. An indicator for electrolytic cells embodying therein a fitting carried by, and communicating with the interior of, a cell, said fitting having a circular seat at the top thereof, a resilient gasket in said seat, a casing comprising a cylindrical body of substantially the same diameter throughout, a reduced throat or outlet, and a concaved or spherical portion connecting said body with said outlet, the lower edge of said body being seated upon said gasket and forming a liquid-proof joint therewith, a yoke bearing upon the concaved or spherical portion of said casing, a cushion disposed between said yoke and said portion of said casing, and means whereby said yoke is forced toward said fitting.

3. An indicator for electrolytic cells embodying therein a fitting carried by, and communicating with the interior of, a cell, said fitting having a circular seat at the top thereof, a resilient gasket in said seat having an annular groove therein, a casing comprising a cylindrical body of substantially the same diameter throughout, a reduced throat or outlet, and a concaved or spherical portion connecting said body with said outlet, the lower edge of said body being seated upon and within the groove in said gasket and forming a liquid-proof joint therewith, a yoke bearing upon the concaved or spherical portion of said casing, and means whereby said yoke is forced toward said fitting.

4. An indicator for electrolytic cells embodying therein a fitting having two branches communicating respectively with different gas compartments within the cell, said branches each having a circular seat at the top thereof, a resilient gasket in each of said seats, casings each comprising a cylindrical body of substantially the same diameter throughout, a reduced throat or outlet, and a concaved or spherical portion connecting said body with said outlet, the lower edge of said bodies respectively being seated upon one of said gaskets and forming a liquid-proof joint therewith, a yoke bearing upon the concaved or spherical portions respectively, and means whereby said yoke is forced toward said fitting.

5. An indicator for electrolytic cells embodying therein a fitting having two branches communicating respectively with different gas compartments within the cell, said branches each having a circular seat at the top thereof, a resilient gasket in each of said seats, each of said gaskets having a groove therein, casings each comprising a cylindrical body of substantially the same diameter throughout, a reduced throat or outlet, and a concaved or spherical portion connecting said body with said outlet, the lower edge of said bodies respectively being seated upon and within the groove in one of said gaskets and forming a liquid-proof joint therewith, a yoke bearing upon the concaved or spherical portions respectively, and means whereby said yoke is forced toward said fitting.

6. An indicator for electrolytic cells embodying therein a fitting carried by a cell, said fitting having a circular seat at the top thereof, a resilient gasket in said seat, a casing comprising a cylindrical body of substantially the same diameter throughout, a reduced throat or outlet, and a concaved or spherical portion connecting said body with said outlet, the lower edge of said body being seated upon said gasket and forming a liquid-proof joint therewith, a yoke bearing upon the concaved or spherical portion of said casing, means whereby said yoke is forced toward said fitting, means whereby gases are delivered within said casing comprising a duct carried by said fitting, one end of said duct forming a water-tight joint with said fitting and opening into a cell, the other end of said duct opening within said casing, a dome inclosing the upper end of said duct and projecting downwardly thereof to adjacent said fitting, and means whereby liquid is fed into said casing and maintained at a level above the lower edge of said dome.

7. An indicator for electrolytic cells embodying therein a fitting having two branches, said fittings each having a circular seat at the top thereof, a resilient gasket in each of said seats, casings each comprising a cylindrical body of substantially the same diameter throughout, a reduced throat or outlet, and a concaved or spherical portion connecting said body with said outlet, the lower edge of said bodies respectively being seated upon one of said gaskets and forming a liquid-proof joint therewith, a yoke bearing upon the concaved or spherical portions respectively, means whereby said yoke is forced toward said fitting, means whereby gases are delivered within each of said casings comprising a duct carried by each of said branches of said fittings and forming a liquid-tight joint therewith, the lower end of said ducts respectively communicating with a gas compartment in said cell, and the other end thereof discharging into said casings respectively, a dome inclosing the upper part of each of said ducts and extending downwardly to adjacent said fittings, and means whereby liquid is fed into said casings respectively and maintained at a level above the lower edges of said domes respectively.

In witness whereof I have hereunto affixed my signature this 10th day of March, 1919, in the presence of two subscribing witnesses.

ISAAC H. LEVIN.

Witnesses:
SARAH R. LEVIN,
WAYNE F. LEE.